July 9, 1940.  C. W. SCHREIBER  2,207,179
TRANSFER APPARATUS
Filed Nov. 10, 1938   11 Sheets-Sheet 2
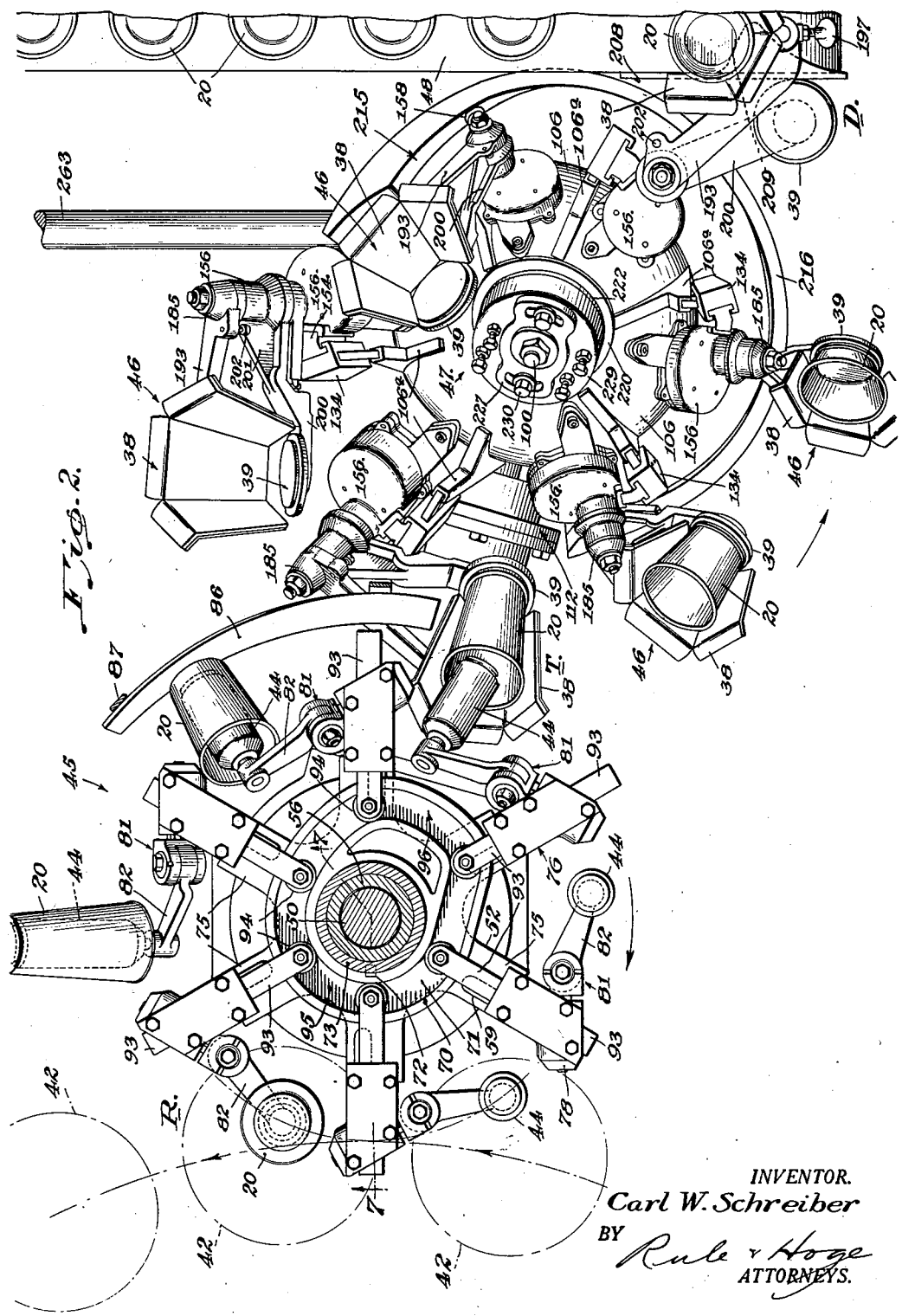
INVENTOR.
Carl W. Schreiber
BY
Rule & Hoge
ATTORNEYS.

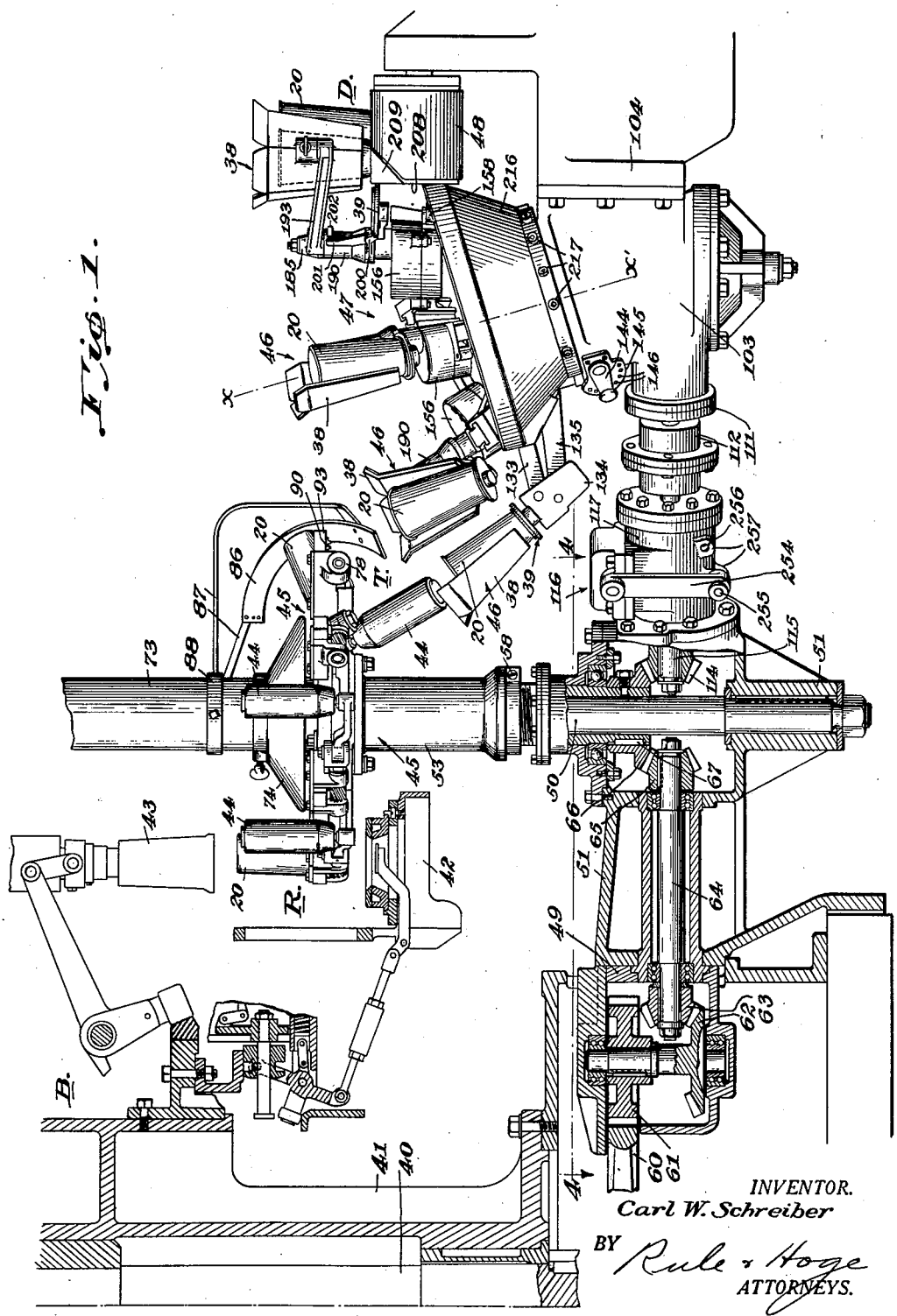

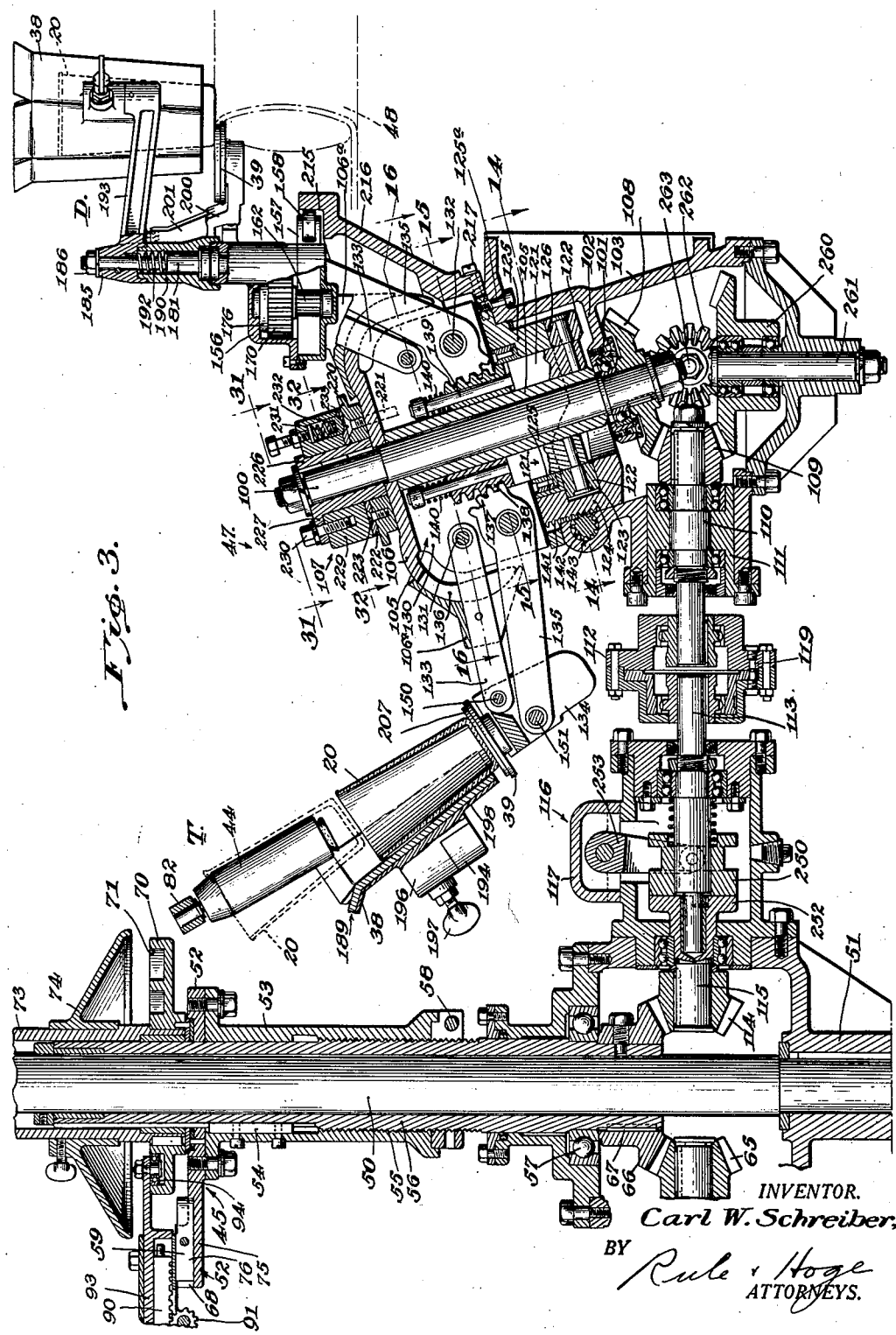

July 9, 1940. C. W. SCHREIBER 2,207,179
TRANSFER APPARATUS
Filed Nov. 10, 1938 11 Sheets-Sheet 4
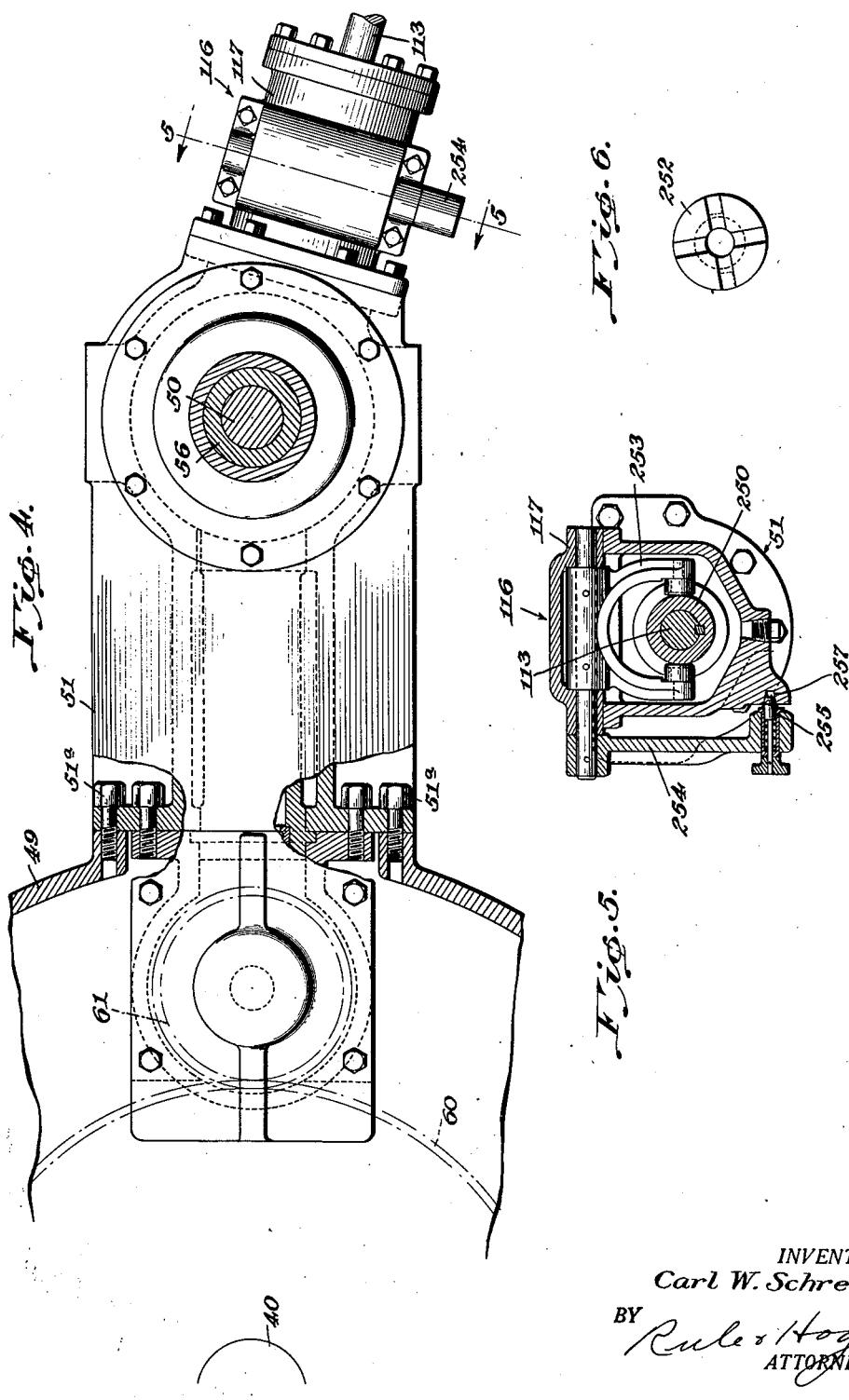
INVENTOR.
Carl W. Schreiber,
BY Rule & Hoge
ATTORNEYS.

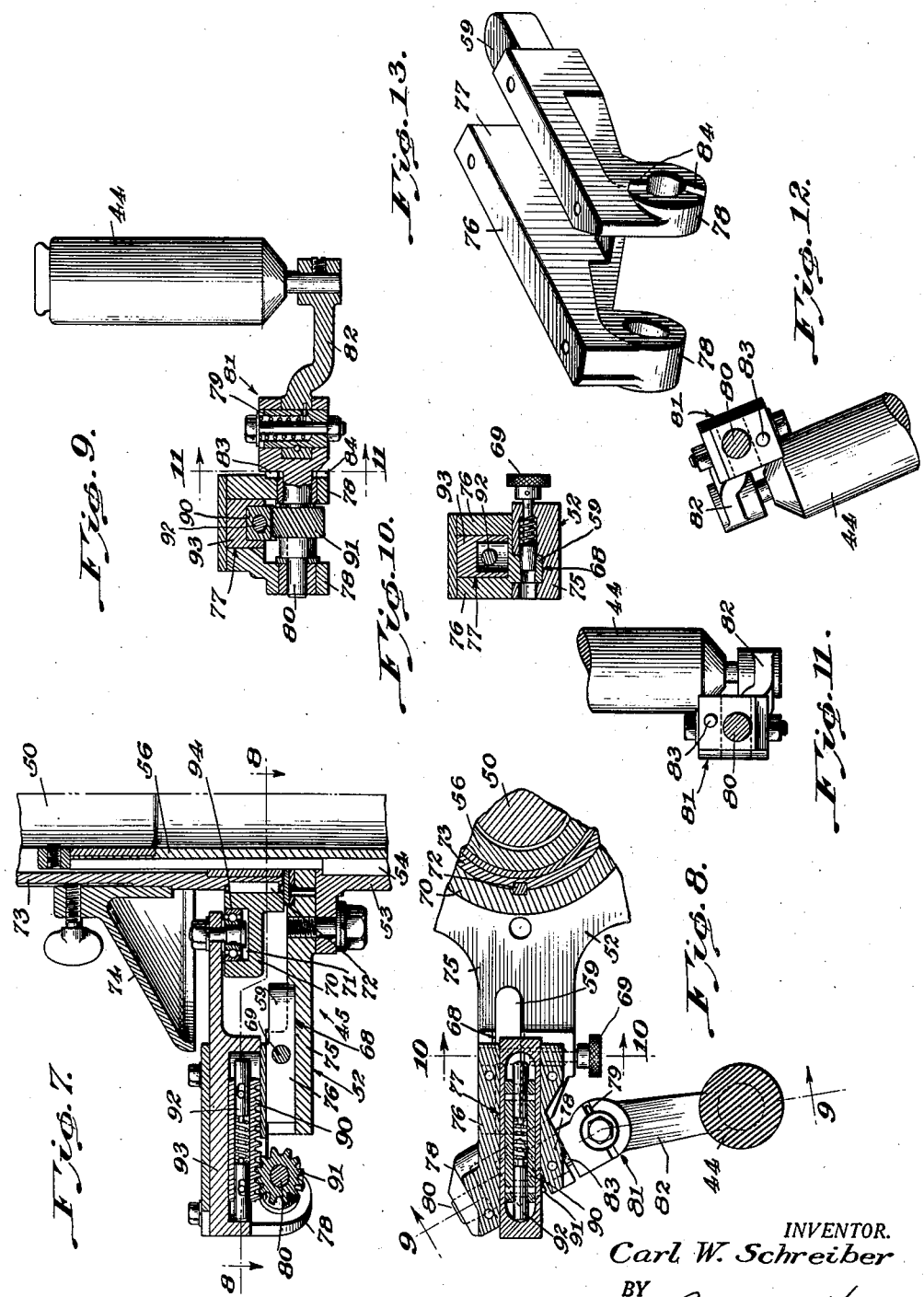

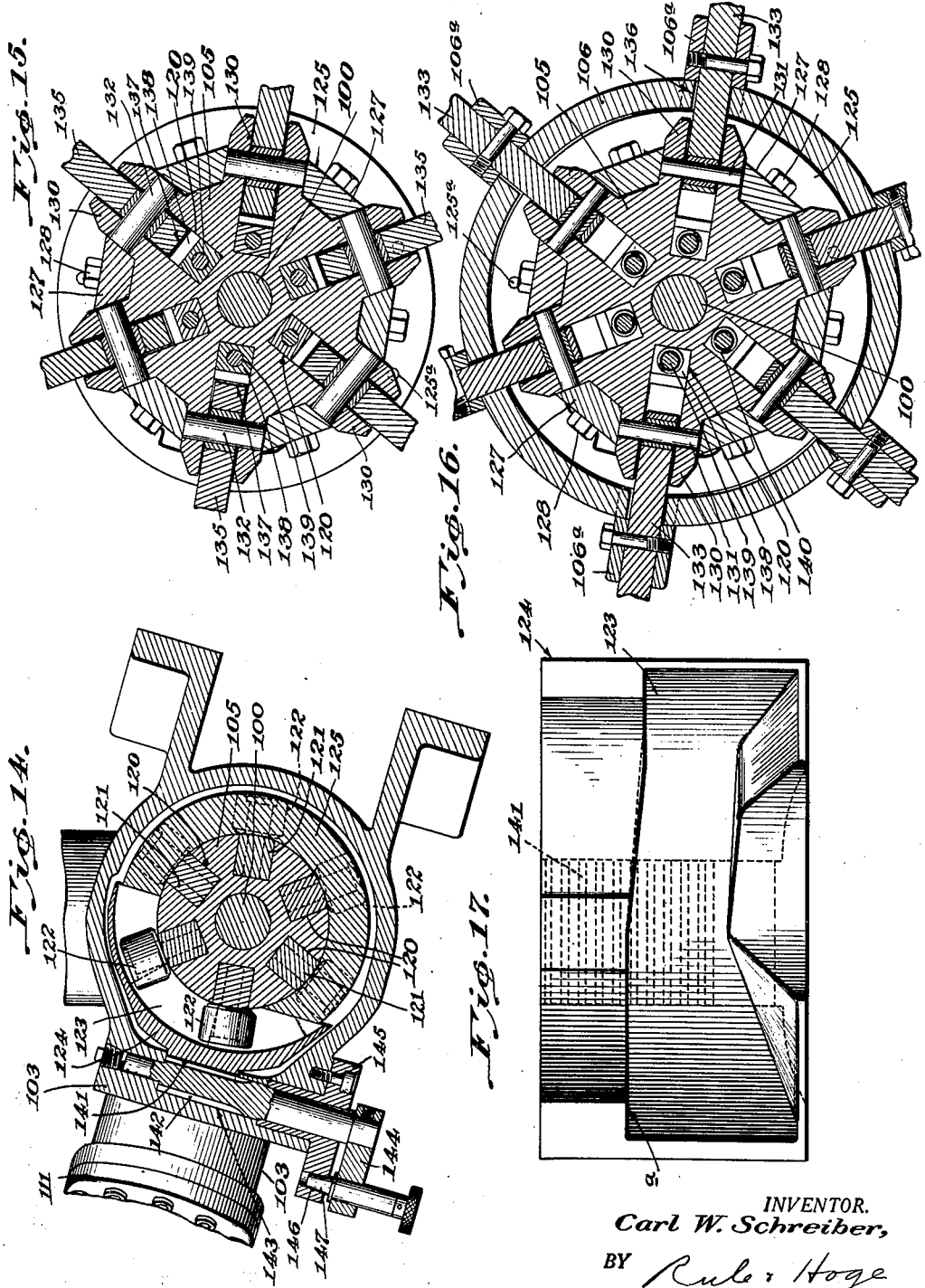

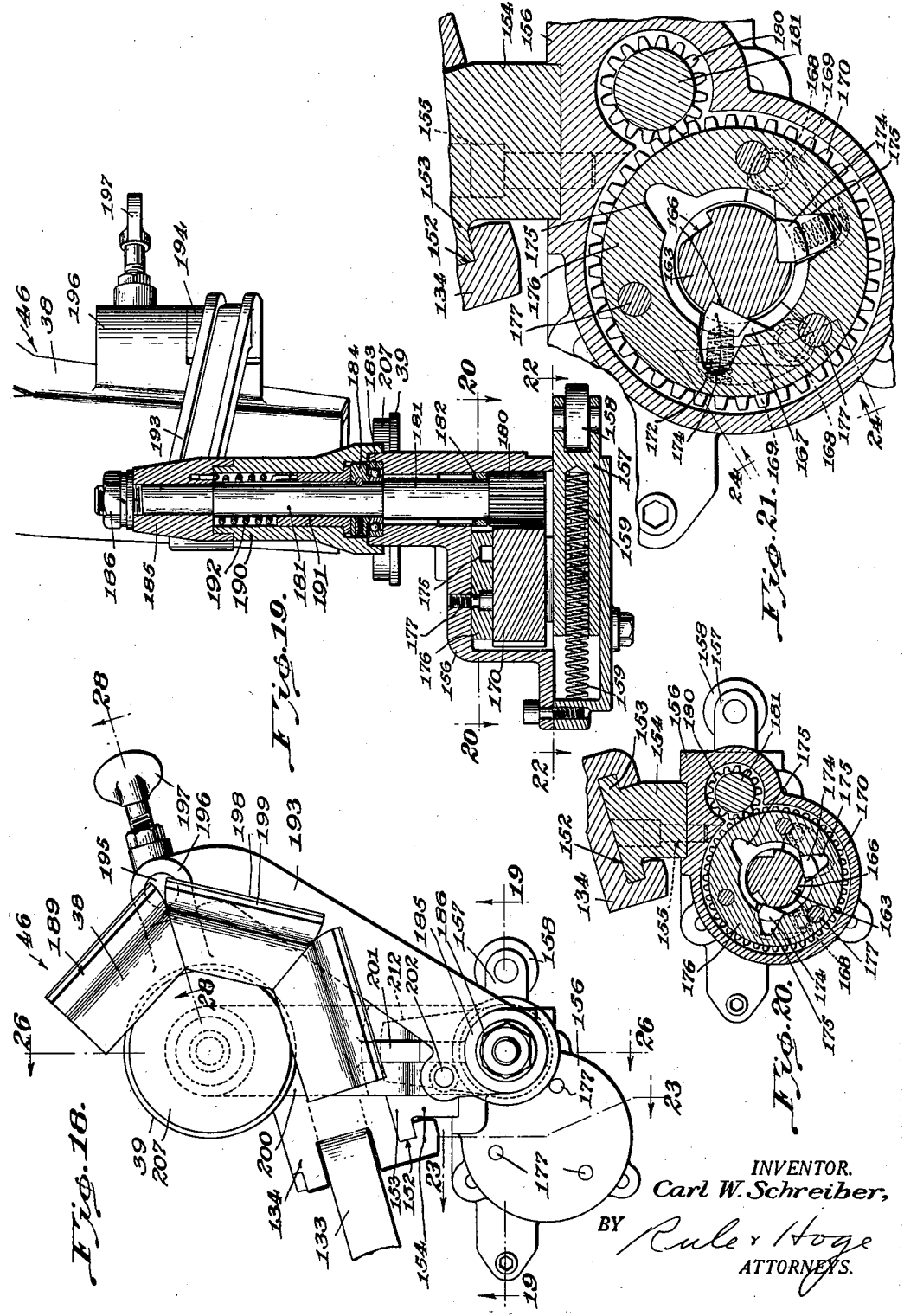

July 9, 1940. C. W. SCHREIBER 2,207,179
TRANSFER APPARATUS
Filed Nov. 10, 1938   11 Sheets-Sheet 8
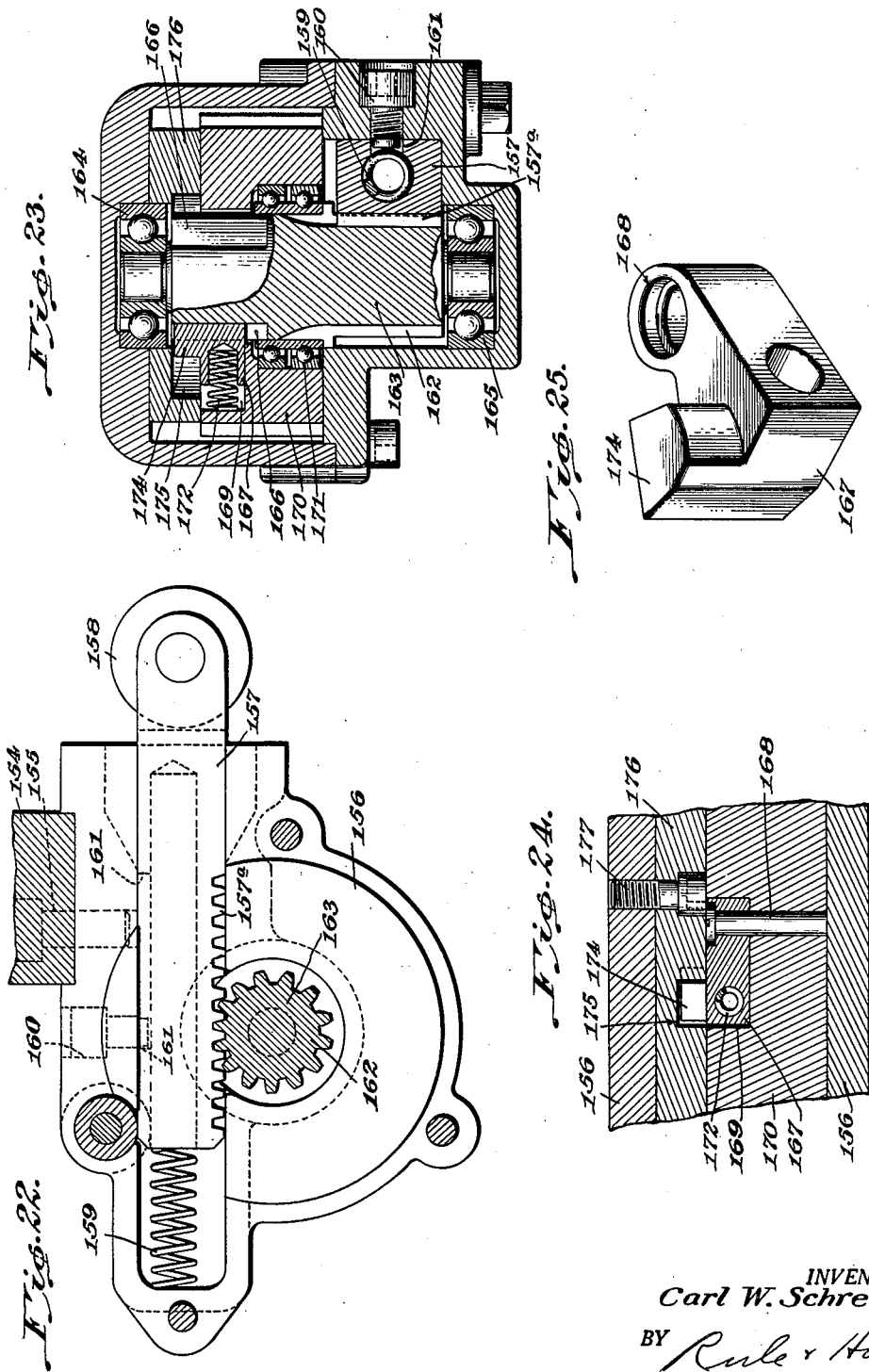
INVENTOR.
Carl W. Schreiber
BY Rule & Hoge
ATTORNEYS.

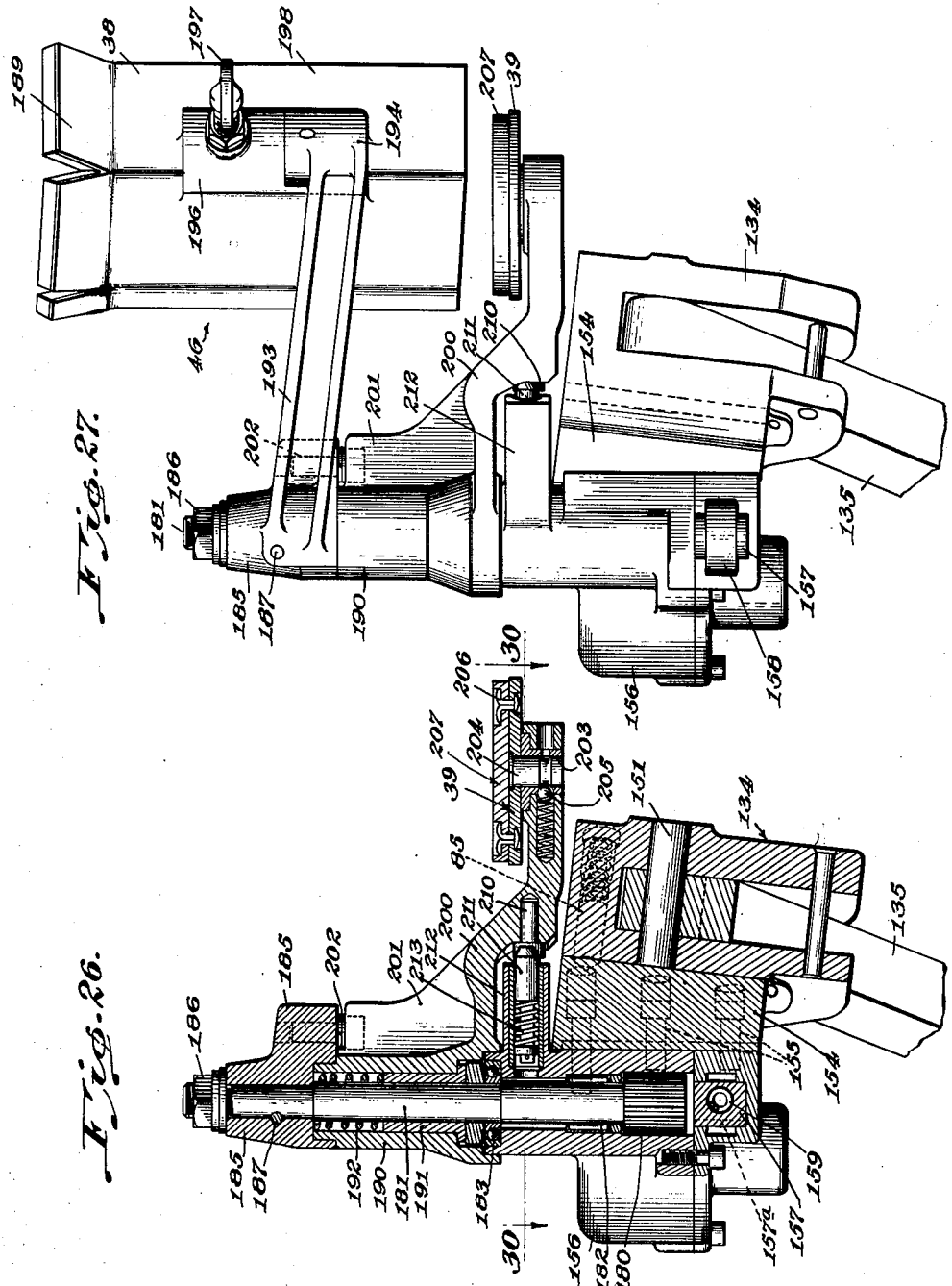

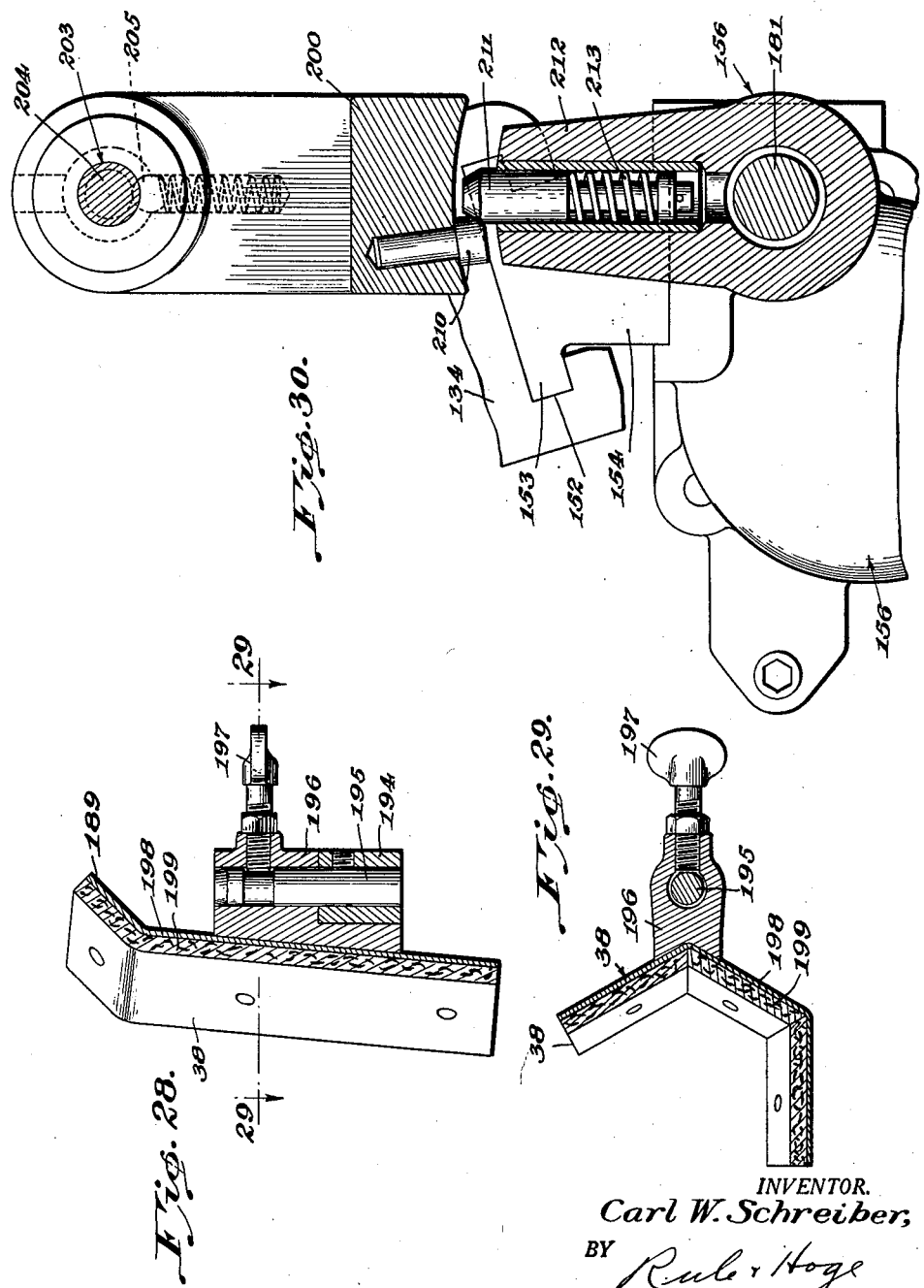

July 9, 1940.   C. W. SCHREIBER   2,207,179
TRANSFER APPARATUS
Filed Nov. 10, 1938   11 Sheets-Sheet 11
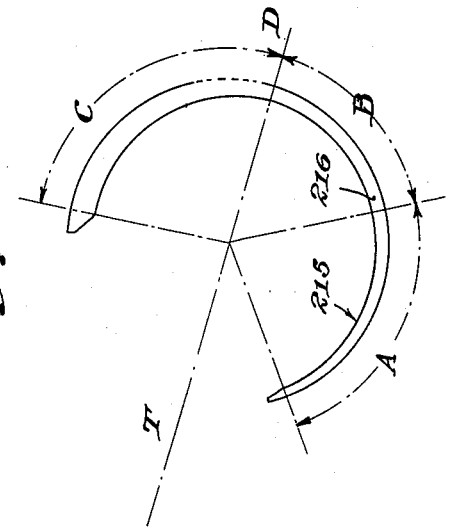
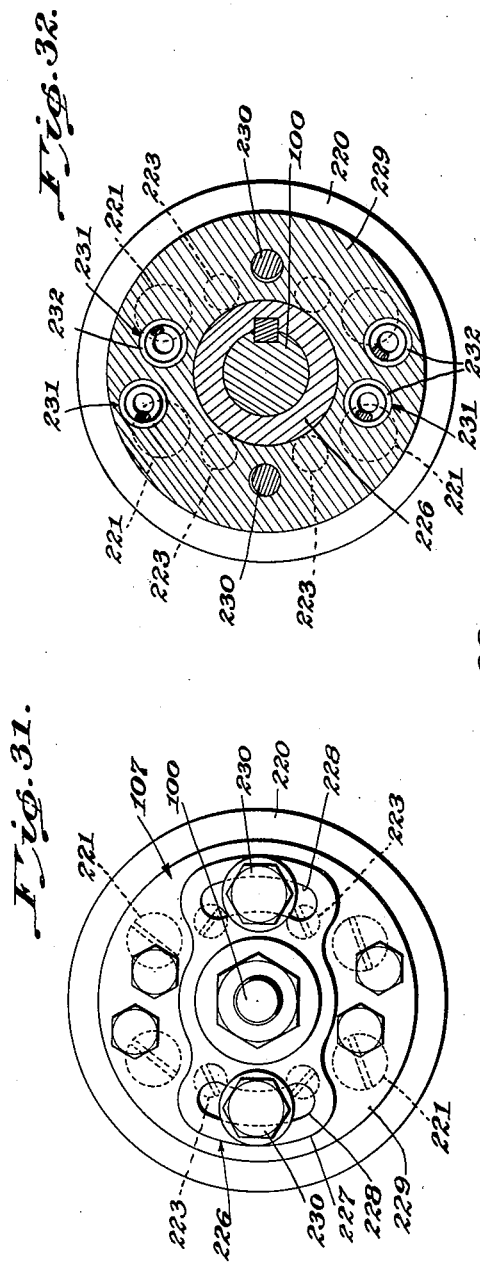
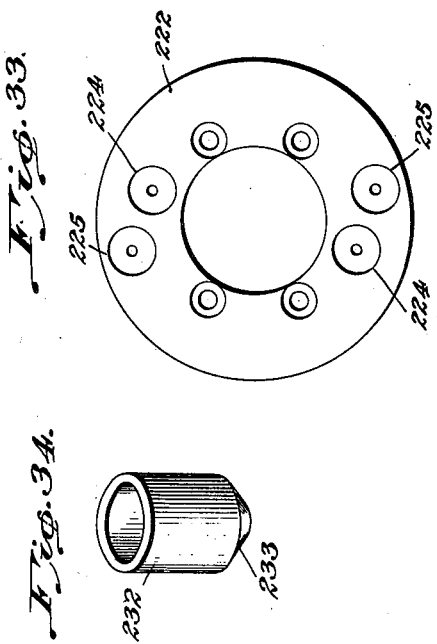
INVENTOR.
Carl W. Schreiber,
BY Rule & Hoge
ATTORNEYS.

Patented July 9, 1940

2,207,179

UNITED STATES PATENT OFFICE 2,207,179

TRANSFER APPARATUS

Carl W. Schreiber, Toledo, Ohio, assignor to Libbey Glass Company, a corporation of Ohio Application November 10, 1938, Serial No. 239,861

16 Claims. (Cl. 198—25)

The present invention relates to transfer apparatus and more particularly to an apparatus for transferring ware from the discharging station of a rotary burn-off machine to a cross conveyor by means of which the ware is conducted to the annealing leer.

Under modern conditions of glassware manufacture, moile is removed from tumblers in a rotary burn-off machine consisting of a rotary carriage having mounted thereon a series of circumferentially spaced burners, above which are positioned and aligned therewith respective vertically movable chucks which receive therein the inverted unfinished tumblers having moile thereon. At a predetermined point in the circular path of movement of the chucks and burners, the tumblers are lowered by the chucks into the region of the respective burners and the moile is burned off. The moile-free tumblers are again elevated and conducted, during the remainder of their circular travel in the machine, to a discharge zone where they are released by the chucks and dropped by gravity in their inverted positions onto a series of "pegs" carried by a rotary "peg table," constituting a take-out device, by means of which they are moved clear of the burn-off machine. In the operation of the apparatus just described, it is required that an operator be stationed at the discharge region of the burn-off machine to remove the inverted tumblers from the rotary peg table and place the same on a conveyor in an upright position preparatory to conveying the same to an annealing leer.

In order to dispense with the necessity of having an operator at the discharge region of the burn-off machine to attend to the uprighting of the tumblers, various mechanisms have heretofore been devised for performing this function automatically. These mechanisms, however, have not proven altogether satisfactory for several reasons. Most of these mechanisms have retained the rotary peg principle of moving the tumblers clear of the burn-off machine and have functionally modified the pegs so that in addition to moving the ware clear of the machine they also perform the function of uprighting the inverted tumblers and discharging the same on the cross conveyor by gravity. Since such mechanisms are predicated upon a gravity discharge of the tumblers, they must necessarily be designed so that the pegs themselves become inverted. Any feasible mechanism for inverting the pegs must take into consideration and reckon with a consequent lowering of the tumblers from the elevation at which they are discharged from the burn-off machine to a much lower elevation amounting to at least twice the length of the pegs. To lower the operative elevation of the cross conveyor is entirely impractical and to raise the elevation of the burn-off machine or its chucks and burners involves complicated mechanical and engineering procedure and at best presents numerous operating difficulties that need not be mentioned at length herein.

The present invention is designed to overcome the above mentioned limitations that are attendant upon the use of transfer apparatus which is predicated upon gravity discharge of the tumblers onto the cross conveyor by the provision of an apparatus which cooperates with the burn-off machine and cross conveyor as they stand and without requiring modification or alteration of either and without resorting to a change in the elevation of either.

This being the principal object of the invention, it is contemplated providing a transfer apparatus which may be positioned at the discharge region of the burn-off machine and which includes a rotary peg table for moving the inverted tumblers clear of the burn-off machine while at the same time partially uprighting the same, together with a cooperating rotary transfer unit which receives the partially uprighted tumblers in an inclined position at a level lower than the level of the cross conveyor and which completes the uprighting operation on the tumblers while simultaneously elevating the same to the level of the cross conveyor and by means of which the tumblers are placed on the latter.

Another object of the invention is to provide such a transfer apparatus wherein there is provided a peg table and a cooperating transfer unit, both of which are adjustable to accommodate different elevations of the chucks and burners of the burn-off machine occasioned by the manufacture of different heights of tumblers.

A still further object of the invention is the provision of a peg table and transfer unit, both of which are driven in unison in timed relation to the rotary movement of the burn-off machine together with a safety clutch associated with the transfer unit and which becomes operative in the event of a tie-up or jam in connection with the latter to disconnect the positive driving connections thereto and thus protect these connections against damage.

The provision of an apparatus of the character set forth above which is extremely rugged and durable and which, therefore, is unlikely to get out of order, one which may be set into operation and left unattended indefinitely, and one which may be manufactured inexpensively, are further desirable features that have been borne in mind in the production and development of the present invention.

With these and many other objects in view which will become readily apparent as the nature of the invention is better understood, the same consists in the construction shown in the accompanying drawings, in which:

Fig. 1 is a side elevational view, partly in section of a transfer mechanism manufactured in accordance with the principles of the present invention and showing the same operatively associated with a burn-off machine and cross conveyor;

Fig. 2 is a top plan view thereof partly in section;

Fig. 3 is generally a longitudinal sectional view taken through the apparatus with certain parts being shown in elevation;

Fig. 4 is a sectional view taken substantially along the line 4—4 of Fig. 1;

Fig. 5 is a sectional view taken substantially along the line 5—5 of Fig. 4;

Fig. 6 is an end elevational view of a clutch member employed in connection with the present invention;

Fig. 7 is a sectional view taken substantially along the line 7—7 of Fig. 2;

Fig. 8 is a sectional view taken substantially along the line 8—8 of Fig. 7;

Fig. 9 is a sectional view taken substantially along the line 9—9 of Fig. 8;

Fig. 10 is a sectional view taken substantially along the line 10—10 of Fig. 8;

Fig. 11 is a sectional view taken substantially along the line 11—11 of Fig. 9;

Fig. 12 is a sectional view similar to Fig. 11 showing one of the pegs in its outwardly and downwardly inclined tumbler discharging position;

Fig. 13 is a perspective view of a bracket employed in connection with the present invention;

Fig. 14 is a sectional view taken substantially along the line 14—14 of Fig. 3;

Fig. 15 is a sectional view taken substantially along the line 15—15 of Fig. 3;

Fig. 16 is a sectional view taken substantially along the line 16—16 of Fig. 3;

Fig. 17 is an inside elevational view of a cam member employed in connection with the present invention;

Fig. 18 is a top plan view of a tumbler receiving transfer unit employed in connection with the present invention;

Fig. 19 is a sectional view taken substantially along the line 19—19 of Fig. 18;

Fig. 20 is a sectional view taken substantially along the line 20—20 of Fig. 19;

Fig. 21 is an enlarged fragmentary sectional view similar to Fig. 20 with the various parts thereof shown in a different position;

Fig. 22 is a sectional view taken substantially along the line 22—22 of Fig. 19;

Fig. 23 is a sectional view taken substantially along the line 23—23 of Fig. 18;

Fig. 24 is a sectional view taken substantially along the line 24—24 of Fig. 21;

Fig. 25 is a perspective view of a dog employed in connection with the present invention;

Fig. 26 is a sectional view taken substantially along the line 26—26 of Fig. 18;

Fig. 27 is a fragmentary side elevational view of the tumbler receiving transfer unit shown in Fig. 18;

Fig. 28 is a sectional view taken substantially along the line 28—28 of Fig. 18;

Fig. 29 is a sectional view taken substantially along the line 29—29 of Fig. 28;

Fig. 30 is a sectional view taken substantially along the line 30—30 of Fig. 26;

Fig. 31 is a view taken substantially along the line 31—31 of Fig. 3;

Fig. 32 is a sectional view taken substantially along the line 32—32 of Fig. 3;

Fig. 33 is a plan view of a plate employed in connection with the present invention;

Fig. 34 is a perspective view of a hollow holding dog employed in connection with the plate of Fig. 33; and Fig. 35 is a diagrammatic view illustrating the various movements of a cam mechanism for controlling the swinging movements of one of a series of tumbler retaining cups associated with the transfer unit.

General description

Referring now to Fig. 1, the relation of the burn-off machine, transfer apparatus and leer cross-conveyor is shown. The transfer apparatus comprising the present invention is adapted to receive inverted tumblers issuing from the burn-off machine and upright the same and place them on the leer conveyor.

Briefly, the burn-off machine B herein disclosed (which forms no part of the present invention and for which no claim to novelty is made) is designed to remove moile from the tumblers 20 and comprises a central column 40 having mounted thereon a rotatable carriage 41 upon which there are supported a series of vertically adjustable circumferentially spaced burners 42 above which are positioned and aligned therewith respective vertically movable chucks 43 which receive therein the unfinished tumblers 20 having moile thereon in an inverted position. At a predetermined point in the circular path of movement of the chucks 43 and burners 42, the tumblers 20 are lowered by the chucks into the region of the respective burners and the moile is burned off. The inverted tumblers are again elevated and are conducted, during the remainder of their travel in the burn-off machine, to the take-out zone of the burn-off machine where they are released by the chucks 43.

Still referring to Fig. 1, upon release of the inverted tumblers 20 from the burn-off machine B, the former fall by gravity at the take-out zone, which is the receiving zone R of the transfer apparatus, onto a series of supports 44 commonly referred to as "pegs" carried by a rotary "peg table" 45 forming a part of the transfer apparatus comprising the present invention, and by means of which the tumblers 20 are partially upended and are deposited in a series of "cups" 46 formed by the register of respective pairs of cradles 38 and tumbler supporting plates 39 carried by a rotary transfer unit 47. The peg table 45 and transfer unit 47 are continuously rotated in opposite directions in synchronism in such a manner that the cups 46 and pegs 44 come into register successively at a transfer zone T and the transfers from the pegs to the cups are periodically effected. The cups 46 at the transfer zone T are inclined and are disposed below the level of the burners 42 and chucks 43 and are also disposed below the level of the cross-conveyor 48 leading to the leer (not shown)

and on which the tumblers 20 are to be deposited. The transfer unit 47 rotates about an inclined axis x—x' and thus normal rotation of the unit 47 will cause the cups 46 and tumblers 20 therein to be elevated to a certain degree in moving from the transfer zone T to the final discharge zone D at which the tumblers are deposited on the cross-conveyor 48. Further elevation of the tumblers 20 and cups 46 accompanied by a tilting movement thereof to fully upright the former is effected during movement of the cups from the transfer zone T to the discharge zone D so that at this latter zone the cradle portions 38 of the cups 46 may be moved over the upper surface of the cross-conveyor to deposit their respective tumblers thereon. Immediately after deposition of the tumblers 20 on the conveyor 48, the cradles 38 are moved clear of the moving tumblers 20 thereon and the cups 46 are returned to the transfer zone T to receive additional tumblers. The operation is continuous.

The peg table

Referring now to Figs. 1, 2 and 3, the peg table 45 is rotatably mounted on a central support or column 50 which is supported at its lower end in a multiple-part gear housing 51 bolted or otherwise secured to the casing 49 of the burn-off machine B. The peg table 45 involves in its general organization a spider 52 bolted to a tubular casing 53 which is keyed as at 54 and threaded as at 55 to a sleeve 56, the latter being rotatably supported in bearings 57 about the central column 50. A clamping mechanism 58 permits the casing 53 to be secured to the sleeve 56 at any desired elevation thereon to vary the elevation of the peg table assembly in setting up the apparatus to accommodate different sizes of tumblers 20 issuing from the burn-off machine B.

The sleeve 56, casing 53 and spider 52 are rotatable as a unit about the central column 50 and are adapted to be continuously driven in the direction indicated by the arrow in Fig. 2 from the ring gear 60 (Fig. 1) of the burn-off machine B through a spur gear 61, bevel gears 62 and 63, shaft 64, and bevel gears 65 and 66, the latter gear being keyed as at 67 to the sleeve 56, and the entire train of driving mechanism being housed within and extending through the burn-off machine casing 49 and gear housing 51.

Positioned on the central column 50 and disposed directly above the spider 52 is a stationary cam plate 70 (Figs. 2 and 3) having formed therein a cam race 71. The cam plate 70 is held stationary by means of a key connection 72 with a stationary sleeve 73 surrounding the upper end of the sleeve 56, and connected to the stationary column 50 adjacent the top thereof. An apron 74 mounted on the sleeve 73 overlies the cam plate 70 and protects the cam race 71 against the admission of dust or other foreign matter. The function of the cam plate 70 and cam race 71 is to cause tilting movement of the various pegs 44 as will appear presently.

Still referring to Figs. 1, 2 and 3, and in addition to Figs. 7 to 12 inclusive, the spider 52 is provided with a plurality of radially extending arms 75, each serving to support a bracket 76 (Fig. 13) thereon. In the present instance the spider is disclosed as having six such radial arms but it is to be understood that a greater or lesser number may be employed. Each bracket 76 is of general U-shape cross-section providing a guideway 77 therein and having aligned depending bosses 78 formed at the outer end thereof. In order to support the bracket 76 a tongue 59 formed thereon extends into a recess 68 in the arm 75 and is held therein by means of a spring pressed locking pin 69. It will be seen, therefore, that the bracket 76, together with all of the mechanism supported thereby, is readily removable from the spider arm 75. Tiltably supported in the bosses 78 is a horizontal rock-shaft 80 which is connected at one end by means of a yieldable knuckle joint assembly 81 to a horizontal peg supporting arm 82 carrying one of the tumbler supporting pegs 44 at its free end and at right angles thereto. A spring 79 maintains the arm 82 inclined at a slight angle to the axis of the rock shaft 80 in the horizontal plane thereof while permitting yielding of the arm should an obstruction be encountered in the operation of the transfer mechanism. Upon rocking movement of the rock shaft 80, the outer end of the arm 82 describes an arc of a circle in a vertical plane while the peg 44 carried at the outer end of the arm 82 is accordingly tilted downwardly and outwardly, all of this occurring as the peg table is rotating. A pin 83 (Figs. 9 and 11) associated with the knuckle joint assembly 81 is adapted to alternately strike a pair of limit stop projections 84 (Figs. 9 and 13) on one of the bosses 78 of the bracket 76 to limit the upward and downward movements of the peg 44.

Rocking movement of the rock shaft 80 is effected by means of a rack 90 (Figs. 7, 8 and 9) which meshes with a pinion 91 mounted on the rock shaft 80. The rack 90 is connected through a yieldable lost motion device 92 to an actuating bar 93 which is slidable in the guideway 77 of the bracket 76 and the inner end of which carries a cam roller 94 riding in the cam race 71. The cam race 71 (Fig. 2) is designed with a substantially circular arcuate portion 95 on the side of the peg table facing the burn-off machine and with an outwardly offset portion 96 on the side of the peg table facing the transfer zone T and thus it will be seen that the various cam rollers 94, riding in the circular portion 95 of the race 71 will serve to retract the actuating bar 93 and maintain the pegs 44 upright as they pass beneath the chucks 43 of the burn-off machine. As the cam rollers 94 move into the outwardly offset portion 96 of the race 71, the actuating bars 93 will be moved radially outwardly of the spider 52 and the tumbler supporting pegs 44 will be swung outwardly and downwardly beyond the horizontal to a nearly inverted but still inclined position for discharge of the tumblers 20 therefrom by gravity.

The throw of the cam race 71 is slightly in excess of that required to invert the peg 44. Thus when the pin 83 comes into contact with the projection 84, the excess movement of the actuating bar 93 is taken up by the lost motion device 92. Similarly, the cam race 71 is designed to move the bar 93 inwardly slightly in excess of the movement necessary to upright the peg 44 so that when the pin 83 engages the projection 84, the lost motion device 92 assimilates the excess motion. Thus accurate orientation of the peg 44 in both of its extreme positions is assured.

To prevent premature discharge of the tumblers 20 from the pegs 44 prior to registry of the latter with the cups 46 at the transfer zone T, a curved guide rail or retaining rail 86 is suspended by straps 87 from an adjustable collar 88 mounted on the stationary sleeve 73.

Referring again to Figs. 1, 2 and 3, the transfer unit 47 is supported on and is rotatable with a central inclined support or shaft 100, the lower end of which is rotatably supported in a bearing 101 carried in a web 102 formed internally on a casing 103, the latter being bolted to a stationary support 104 (Fig. 1). Mounted on the shaft 100 and designed for rotation therewith is a casting 105 in the form of a spider (see also Figs. 14, 15 and 16) to which there is secured, and over which there extends, a rotatable dome-shaped turret 106. The turret 106 and casting 105 are connected in driving relationship to the central shaft 100 through the medium of a slip or safety clutch mechanism designated generally at 107 and which for the present will not be fully described but will be referred to later.

In order to drive the central shaft 100, casting 105 and turret 106 as a unit, the lower end of the shaft 100 has secured thereto a bevel gear 108 (Fig. 3) which meshes with a second similar gear 109 mounted on a shaft 110 rotatably supported in a bearing unit 111 disposed in the casing 103. The shaft 110 is connected through a coupling 112 having a shear pin 119 associated therewith to a shaft 113, the latter deriving rotary motion from a gear 114 meshing with the gear 66 of the peg table driving mechanism and mounted on a shaft 115 which is connected to the shaft 113 through a manually operable clutch mechanism 116 disposed in a casing 117 secured to the gear housing 51. The nature of the clutch mechanism 116 will be set forth presently.

Referring now to Figs. 3, 14, 15 and 16, the casting 105 is formed with a series of radial slots 120 therein in each of which there is slidably disposed a bar 121 having a cam roller 122 thereon adapted to travel in a cam race 123 formed internally on a vertically adjustable cam member 124 (see also Fig. 17) partially surrounding the lower end of the casting 105. A second and stationary cam member 125 bolted to the casing 103 as at 125ᵃ surrounds the casting 105 and is provided with an effective cam surface 126 at its lower edge on the side thereof opposite to the cam member 124 and beneath which the rollers 122 are adapted to pass and against which they are adapted to bear upwardly.

The upper region of the casting 105 is formed with a series of radial wings 130 (Figs. 2, 15 and 16) through which the slots 120 extend. Upper and lower hinge pins 131 and 132 respectively (see also Fig. 3) extend across each slot. Retaining blocks 127 secured by bolts 128 between the wings 130 serve to prevent dislodgement of the hinge pins 131 and 132. Rockably connected to each upper hinge pin 131 is a link 133, the free end of which is pivotally connected to a cup assembly support 134. Similarly, rockably connected to each lower hinge pin 132 is a link 135, the free end of which is pivotally connected to the cup assembly support 134 at a point spaced from and below the pivotal connection for the link 133. The links 133 and 135 extend through slots 136 formed radially in the dome-shaped turret 106. The portion of the turret 106 in which the slots 136 are formed is of circular curvature and a follower 106ᵃ is pivoted to each link 133 and rides on the turret 106.

The upper links 133 are free, that is, their movement is entirely dependent upon the swinging movement of the cup assembly supports 134, while the lower links 135 are positively actuated and swing about the hinge pins 132 to elevate or lower the cup assembly supports 134. Toward this end, the inner end of each link 135 has integrally formed thereon a fragmentary gear or gear sector 137, the teeth of which mesh with a toothed rack 138 slidably disposed on a pin 139 in one of the slots 120 and normally maintained seated upon one of the bars 121 disposed in the slot by means of a coil spring 140.

From the above description of parts it will be seen that as the cam rollers 122 travel through the cam race 123 and upon the cam surface 126 in their path of movement about the central shaft 100, the bars 121 and racks 138 associated therewith are reciprocated vertically in the slots 120 and the racks 138, meshing with the gear sectors 137, impart tilting movement to the lower links 135 and cause the cup assembly supports 134 to become elevated and lowered as required. It is also to be noted that while the lower links 135 serve to positively swing the cup assembly supports 134 about the axes of the hinge pins 132 to lower or raise the same, the upper links 133 being shorter than the lower links, function as tilting means for the cup assembly supports 134. Thus in the lower positions of these supports, when the latter are in the vicinity of the transfer zone T as shown in Fig. 3, the cup assembly supports 134 are inclined outwardly whereas in the upper positions thereof in the vicinity of the discharge zone D, the cup assembly supports 134 are substantially erect.

In order that the cup assembly supports 134 shall assume their lower inclined positions at the transfer zone T, the cam race 123 in the cam member 124 (Fig. 17) is formed with an elevated portion $a$ onto which the rollers 122 ride when the respective supports are at the transfer zone. Similarly, in order that the supports shall assume their upper positions in the vicinity of the discharge zone D, the level of the cam surface 126 on the cam member 125 is disposed below the level of the lowermost position of the portion $a$ of the cam race 123.

Referring now to Figs. 3 and 14, means is provided for manually adjusting the elevation of the cam member 124 bodily in order that the lowermost position of the cup assembly supports 134 at the transfer zone T may be varied to accommodate differences in the elevation of the peg table 45 and different heights of the tumblers T being transferred. The outer side of the cam member 124 has formed thereon a rack 141, the teeth of which mesh with a pinion 142 disposed within a recess 143 in the casing 103. The pinion 142 is connected exteriorly of the casing 103 to an actuating lever 144 (Figs. 1 and 14) by means of which the adjustment under discussion may be effected. A plate 145 secured to the casing 103 has formed therein a series of holes 146 into which a pin 147 may be selectively dropped to maintain the lever 144 in the desired adjusted position. It is to be noted that vertical adjustment of the cam member 124 will maintain substantially the same inclination of the cup assembly supports 134 at all times. The cam member 125, unlike the cam member 124, is fixed and therefore regardless of the adjusted position of the latter, the upper position of the cup assembly supports at the discharge zone D remains the same as well as does its inclination.

Referring now to Figs. 3 and 18 to 30 inclusive, each cup assembly support 134 (Figs. 26 and 27) is in the form of a bifurcated bracket across the furcations of which there extend upper and lower hinge pins 150 and 151 respectively. The free upper link 133 for controlling the tilting movement of the cup supporting assembly 134 is pivotally connected to the hinge pin 150 while the positively actuated lower link 135 is pivotally connected to the lower hinge pin 151. The support 134 is formed with a recess 152 (Figs. 20 and 21) therein in which there is received a head 153 formed on a block 154, the latter being bolted as at 155 to a two-piece casing 156 (Figs. 19, 20, 21, 26 and 27). A spring pressed locking detent 85 holds the head 153 in position in the recess 152.

Projecting through the wall of the casing 156 and movable from an extended position to a retracted position in the casing is a rack bar 157 carrying a cam roller 158 at its outer end. A coil spring 159 normally urges the rack bar 157 to its extended position. A guide pin 160 (Fig. 23) extends into a slot 161 in the rack bar 157 and limits the inward and outward sliding movements thereof. The rack bar 157 is formed with teeth 157ᵃ (Figs. 22 and 23) thereon which mesh with a pinion 162 integrally formed on a stub shaft 163 vertically disposed in the casing 156 and supported at its upper and lower ends in bearings 164 and 165 respectively. The upper portion of the shaft 163 is provided with a series of notches 166 (Fig. 21) therein, the number of which is immaterial but of which three are disclosed. A plurality of pawls 167 (see also Fig. 25) of which two are illustrated, are pivoted as at 168 (Figs. 21, 23 and 24) in a like number of recesses 169 formed in a gear 170 which is rotatable in the casing 156 in bearings 171 surrounding the shaft 163. The pawls 167 are spring pressed as at 172 and are normally urged into positions wherein they will project into any two of the notches 166 in the shaft 163. Upon turning movement of the shaft 163, the pawls 167 ride into and out of the notches 166 and when not occupying a position in the notches 166, they are locked in fixed position by virtue of the protuberances 174 (Figs. 20, 21 and 25) thereon which enter recesses 175 (see also Fig. 19) formed in a plate 176 secured by studs 177 to the upper portion of the casing 156. In this position of the pawls 167, the gear 170 is prevented from turning.

The gear 170 meshes with a pinion or gear 180 (Figs. 19, 20 and 21) formed on the lower end of a shaft 181 that extends upwardly through the casing 156 and which is supported medially of its ends in a lower lubricating bearing 182 (Figs. 19 and 26) and in an upper bearing 183. A collar 184 secured to the shaft 181 secures the bearing 183 in position. A cradle supporting head 185 (Figs. 19, 26 and 27) is secured by means of a nut 186 to the upper end of the shaft 181 and is keyed to the same as at 187. A tumbler plate supporting head 190 having a driving fit with a sleeve 191 is disposed on the medial portion of the shaft 181 and a coil spring 192 has its opposite ends anchored in the head 185 and sleeve 191 respectively. The sleeve 191 is mounted for free turning movement of the shaft 181.

Projecting laterally from the cup supporting head 185 and integrally formed therewith is a cradle supporting arm 193 (Figs. 19 and 27) provided with a boss 194 at its free end. A stub shaft 195 (Figs. 18, 28 and 29) secured in the boss 194 has adjustably secured thereto a cradle supporting plate 196 (see also Fig. 27) the angularity of which with respect to the arm 193 may be maintained in any desired adjusted position by means of a wing type set screw 197. Secured to the cradle supporting plate 196 and best illustrated in Fig. 29 is one of the tumbler receiving cradles 38 which is three-sided in form and includes an outer metal casing 198 and an inner lining 199 of asbestos or other heat resisting material. The upper regions of the casing 198 are flared outwardly as at 189 (Fig. 28) as a precautionary measure to guide the tumblers 20 released from the pegs 44 of the peg table 45 thereinto at the transfer zone T.

Projecting laterally from the tumbler plate supporting head 190 and integrally formed therewith is a tumbler plate supporting arm 200 (Figs. 26 and 27) having a web 201 formed thereon. A stud 202 threaded into the cradle supporting head 185 normally bears against the web 201 and fixes the normal positions of the cradle supporting and tumbler plate supporting arms 193 and 200 respectively relative to each other. The spring 192, however, permits movement of the arm 200 relative to the arm 193 for a purpose that will be set forth later.

The outer end of the arm 200 is provided with a vertical bore 203 therein in which there is received the shank 204 of the tumbler supporting plate 39 while a spring pressed ball 205 removably retains the shank 204 in the bore 203 against dislodgment. The plate 39 is in the form of a circular disk to which there is secured by means of rivets 206 or the like an asbestos or other heat resisting pad 207 upon which the hot tumblers 20 issuing from the peg table 45 are adapted to be received at the transfer zone T and on which the tumblers are supported during their movement from this zone to the discharge zone D wherein they are deposited on the cross-conveyor 48.

Referring now to Figs. 26, 27 and 30, while the spring 192, stud 202 and web 201 normally maintain the cradle supporting head 185 and tumbler plate supporting head 190 in a definite fixed relation so that the tumbler supporting plate 39 normally occupies a position directly in register with its respective cradle 38, and in combination therewith forms in effect a tumbler receiving receptacle or cup, a pair of abutments 210 and 211 serve to positively maintain this relationship of register until such time as the arm 200 is forcibly swung about the axis of the shaft 181 relative to the arm 193 as will presently be described. The abutment 210 is in the form of a stud received in the arm 200 while the abutment 211 is in the form of a plunger having a tapered end and which is slidable in a boss 212 formed on the casing 156. A spring 213 normally maintains the plunger 211 extended. The abutment 210 normally occupies a position behind the abutment or plunger 211 and the arms 193 and 200 are thus, in effect, locked in position until such time as the cup assembly arrives at the discharge zone D, at which time the edge of the tumbler supporting plate 39 contacts a plate 208 formed on a bracket 209 secured to a stationary part of the cross-conveyor 48 and is thus retarded in its normal revolving movement about the axis of the turret 106 as shown at the extreme bottom right hand side of Fig. 2 and as will be more fully set forth during the description of the operation of the transfer apparatus presently to follow.

Referring now to Figs. 2, 3 and 35, the cam roller 158 on the rack bar 157 which controls the swinging movement of the cradle supporting arm 193 and tumbler plate supporting arm 200 is adapted upon rotation of the turret 106 to ride on a cam surface 215 provided on a curved cam wall 216 bolted as at 217 (see also Fig. 1) to the cam member 125. The cam surface 215 is so designed that during movement of the heads 185 and 190 from the transfer zone T toward the discharge zone D through the zone indicated at A in Fig. 35, the rack bar 157 is forced gradually inwardly of the casing 156. Such movement of the rack bar 157 imparts turning movement to the pinion 162 and shaft 163 (Figs. 22 and 23) until such time as the protuberances 174 (Figs. 20 and 21) enter the notches 166 provided in the shaft 163 whereupon the gear 170 is picked up and continuous rotation of the shaft 163 causes turning movement of this gear. Such turning movement of the gear 170 acts through the pinion 189 and shaft 181 to cause turning movement of the heads 185 and 190, thus swinging the arms 193 and 200 in a direction opposite to the direction of rotation of the turret 106 through an angle of approximately ninety degrees. The cam roller 158 then enters upon a dwell portion of the cam surface, indicated at B in Fig. 35, and further rotation of the gear 170 ceases until such time as the cradle 38 has deposited its tumbler 20 upon the cross-conveyor 48 and by movement concentric with the axis of the turret 106 has advanced the tumbler into proper spaced relationship with its predecessors. At this point, the cam roller 158 enters a portion of the cam surface designated in Fig. 35 at C whereupon the rack bar 157 is forced fully inwardly and the gear 170 is further rotated in the same direction as previously until such time as the protuberances 174 come into register with the recesses 175 in the plate 176 next adjacent to those which they had previously vacated. Such rotation of the gear 170 moves the arms 193 and 200 in the same direction as the direction of their initial swinging movement through an angle of approximately two hundred and seventy degrees and restores them to their initial tumbler receiving position. The cam roller 158 passes off of the cam surface 215 and the spring 159 restores the rack bar 157 to its projected position. In so moving, the shaft 163 is rotated in the opposite direction and the protuberances 174 are forced into the recesses 175 as they ride outwardly from the notches 166 in the shaft 163, thus locking the gear 170 as previously described. When the rack bar 157 becomes finally extended under the influence of the spring 159 with one end of the slot 161 bearing against the guide pin 160, the shaft 163 comes to rest with the protuberances 174 occupying positions on the circumference of the shaft as shown in Fig. 20.

Referring now to Figs. 2, 3, and 31 to 34 inclusive, the slip or safety clutch mechanism 107 previously referred to includes a circular ring-like base plate 220 secured by means of bolts 221 to the turret 106 and casting 105 centrally thereof. A face plate 222 in the form of a ring is secured by means of screws 223 to the base plate 220 centrally thereof. A pair of recesses 224 are diametrically disposed in the upper surface of the face plate 222 at equally spaced points from the center thereof. Similarly, a pair of recesses 225 are also diametrically disposed in the face plate 222 but are spaced from each other a distance greater than the distance between the recesses 224.

The central shaft 100 extends upwardly through the turret 106 and base plate 220 and has keyed thereto a sleeve 226. The sleeve 226 is formed with a flange 227 thereon having slots 228 therein. A driving ring 229 is adjustably secured by means of bolts 230 extending through the slots 228 to the sleeve 226 and is formed with recesses 231 therein adapted to register with the recesses 224 and 225. Spring pressed plungers 232, one of which is shown in Fig. 34, are slidably disposed in the recesses 231 of the ring 229 and are adapted to enter the recesses 224 and 225 to cause rotation of the turret upon rotation of the shaft 100. The recesses 224 and 225 are shallow and the sides thereof are inclined outwardly. The lower ends of the plungers 232 are tapered as at 233 (Fig. 34) and thus it will be seen that while a positive drive between the shaft 100 and turret 106 is effected, any obstruction tending to stop rotation of the turret 106 will cause the plungers 232 to ride out of their corresponding recesses. The diametrical arrangement of the recesses 224 and 225 respectively insures registry of the transfer device 47 and peg table 45 after the condition resulting in obstruction of the turret 106 has been remedied.

The clutch mechanism 116 previously referred to is best illustrated in Figs. 3 and 5. This mechanism comprises a spring pressed clutch member 250 mounted on and keyed to the shaft 113 in the clutch casing 117 and which is shiftable from a position of engagement with a second clutch member 252 formed on the shaft 115 to a position out of engagement therewith. A conventional shifting fork 253 is provided with an actuating arm 254 exteriorly of the casing 117 having a pin 255 carried in the end thereof and which is selectively receivable in a pair of holes 256 provided in respective lugs 257 formed on the casing 117. The clutch mechanism just described is purely conventional and no claim is made herein to any novelty associated therewith.

Referring now to Fig. 3, a gear 260 is mounted on a shaft 261 journalled in the casing 103 and meshes with the gear 109. The gear 260 meshes with a similar gear 262 mounted on the shaft 263 by means of which the cross-conveyor 48 is driven.

*Operation of the transfer apparatus*

In the operation of the transfer apparatus, rotation of the burn-off machine B (Fig. 1) operates through the ring gear, gears 61, 62 and 63, shaft 64, and gears 65 and 66, to drive the peg table 45 in synchronism with the burn-off machine as previously described in such a manner that the upright pegs 44 come into register with the chucks 43 successively to receive thereon the inverted tumblers released at the receiving zone R.

In moving from the receiving zone R to the transfer zone T, each peg 44 (Fig. 2) is swung outwardly and downwardly by virtue of the cam roller 94 which rides in the cam race 71 and causes the actuating bar 93 (Figs. 7 and 8) to be moved radially outwardly, thus actuating the rack 90 and pinion 91 and rocking the stub shaft 80. As the peg 44 assumes a position beyond the horizontal, the tumbler 20 bears against the curved guide rail 86 and is held against premature discharge from the peg until such time as the inclined and substantially inverted peg comes into register with one of the cups 46 at the transfer zone T.

The transfer unit 47, being driven in synchronism with the peg table 45 through the medium of the gears 66, 114, clutch mechanism 116, coupling 112, shaft 110 and gears 109, 108, as previously described, register of the successive cups and pegs at the transfer zone T is insured.

The tumblers 20 released at the transfer zone T are received on the tumbler supporting plates 39 and are partially enclosed by the cradles 38 and are conveyed toward the discharge zone D.

In moving from the transfer zone T to the discharge zone D, each of the cam rollers 158, riding upon the cam surface 215 through the zone A (Fig. 35) causes the rack bar 157 to be moved partially inwardly, thus actuating the various instrumentalities contained within the casing 156 (Fig. 19) in the manner previously described to cause turning movement of the heads 185 and 190 and swing the arms 193 and 200 in a direction opposite to the direction of rotation of the turret 106 through an angle of approximately ninety degrees. In moving from the transfer zone T to the discharge zone D, the cam roller 122 rides off of the cam surface a (Fig. 17) and passes onto the cam surface 126 (Fig. 3) of the stationary cam member 125 to maintain the tumbler supports 39 elevated and substantially horizontal at the level of the cross-conveyor 48.

The cam roller 158 then enters the dwell zone B and further swinging movement of the arms 193 and 200 ceases although their revolution about the axis of the turret 106 continues. Such revolution of the arms 193 and 200 brings the tumbler support 39 into engagement with the plate 208 adjacent the side of the cross-conveyor 48 and the tumbler 20 is moved or pushed onto the upper surface of the bracket 209 and over the same and moves onto the conveyor and is spaced thereon while the cam roller 158 is still in the dwell zone B. When the tumbler support 39 strikes the edge of the cross-conveyor 48, the arm 200 yields under the influence of the spring 192 as shown at the lower right hand side of Fig. 2.

After the spacing of the tumblers 20 on the cross-conveyor 48, the cam roller 158 enters the zone C and further inward movement thereof swings the arm 193 through the balance of a complete revolution, i. e., through an angle of approximately two hundred and seventy degrees. The arm 193 picks up the arm 200 as the lug 202 strikes the web 201 and the tumbler support 39 and cradle 38 are restored to their cup forming and tumbler receiving positions at the transfer zone T. Meanwhile, immediately prior to their arrival at the transfer zone T, the cam roller 122 passes off the cam member 125 and returns to the cam race 123 of the cam member 124, thus lowering the cup assembly supports 134 to the tumbler receiving positions of the cup assemblies 46.

Modifications may be resorted to within the spirit and scope of the appended claims.

I claim:

1. Apparatus for transferring tumblers from a burn-off machine to a conveyor, comprising mechanism for receiving tumblers in an inverted position as they are released from the burn-off machine and discharging them in a substantially upright position in a transfer zone, a series of tumbler receiving cups movable along an inclined plane in a closed path in part overlying said conveyor and extending through said zone, each cup including a bottom supporting plate and separate cradle, and means for effecting transfer of the tumblers from the cups to the conveyor in an upright position including automatic mechanism for retracting the bottom supporting plate and thereafter causing a corresponding movement of the cradle.

2. In a tumbler transfer apparatus, means for receiving inverted tumblers at the take-out zone of a burn-off machine and for partially uprighting the same and for discharging the partially uprighted tumblers by gravity at a transfer zone, a plurality of tumbler receiving cups mounted for revolution about an inclined axis and movable upon revolution thereof from a lowered position at the transfer zone to an elevated position at a discharge zone, each cup comprising a tumbler receiving cradle and a tumbler support normally in register therewith and movable independently relative thereto, and an abutment at the discharge zone in the path of movement of the support and adapted to be engaged by the latter to move the same out of register with the cradle to release the tumbler supported thereby.

3. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports pivoted to the turret and movable upon rotation of the turret from lowered positions in the vicinity of the transfer zone to elevated positions at a discharge zone, a cradle supporting head and a plate supporting head mounted for independent rotation about a common axis on each cup assembly support, a cradle supporting arm having a cradle thereon and a plate supporting arm having a tumbler supporting plate thereon secured to the cradle supporting and plate supporting heads respectively, and means operable upon movement of the cup assembly supports from the transfer zone to the discharge zone for rotating the cradle supporting head on the cup support through a predetermined angle in one direction, said last mentioned means being operable upon movement of the cup assembly supports from the discharge zone to the transfer zone for rotating the cradle supporting head in the same direction throughout a reflex angle supplementary to said first mentioned angle.

4. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports pivoted to the turret and movable upon rotation of the turret from lowered position in the vicinity of the transfer zone to elevated positions at a discharge zone, a cradle supporting head and a plate supporting head mounted for independent rotation about a common axis on each cup assembly support, a cradle supporting arm having a cradle thereon and a plate supporting arm having a tumbler supporting plate thereon secured to the cradle supporting and plate supporting heads respectively, and means operable upon movement of the cup assembly supports from the transfer zone to the discharge zone for rotating the cradle supporting head on the cup support through an angle of substantially ninety degrees in one direction, said last mentioned means being operable upon movement of the cup assembly supports from the discharge zone to the transfer zone for rotating the cradle supporting head in the same direction through an angle of substantially two hundred and seventy degrees.

5. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports pivoted to the turret and movable upon rotation of the turret from lowered position in the vicinity of the transfer zone to elevated positions at a discharge zone, a cradle supporting head and a plate supporting head mounted for independent rotation about a common axis on each cup assembly support, a cradle supporting arm having a cradle thereon and a plate supporting arm having a tumbler supporting plate thereon secured to the cradle supporting and plate supporting heads respectively, and means operable upon movement of the cup assembly supports from the transfer zone to the discharge zone for rotating the cradle supporting head on the cup support through a predetermined angle and operable upon movement of the cup assembly supports through the discharge zone for preventing rotation of the cradle supporting head and also operable upon movement of the cup assembly supports from the discharge zone to the transfer zone for rotating the cradle supporting head throughout a reflex angle supplementary to the first mentioned angle in the same direction.

6. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports pivoted to the turret and movable upon rotation of the turret from lowered position in the vicinity of the transfer zone to elevated positions at a discharge zone, a cradle supporting head and a plate supporting head mounted for independent rotation about a common axis on each cup assembly support, a cradle supporting arm having a cradle thereon and a plate supporting arm having a tumbler supporting plate thereon secured to the cradle supporting and plate supporting heads respectively, and cam means operable upon movement of the cup assembly supports from the transfer zone to the discharge zone for rotating the cradle supporting head on the cup support through a predetermined angle and operable upon movement of the cup assembly supports from the discharge zone to the transfer zone for rotating the cradle supporting head throughout a reflex angle supplementary to the first mentioned angle in the same direction.

7. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports pivoted to the turret and movable upon rotation of the turret from lowered positions in the vicinity of the transfer zone to elevated positions in the vicinity of a discharge zone, a cradle supporting head and a plate supporting head mounted for rotation about a common axis on each cup assembly support, a cradle supporting arm and a plate supporting arm secured to the cradle supporting head and plate supporting head respectively, a cradle on the cradle supporting arm, a tumbler supporting plate on the plate supporting arm, means normally and yieldingly maintaining the cradle and plate in register, and an abutment in the vicinity of the discharge zone positioned in the path of movement of the plates and adapted to be successively engaged by the latter upon rotation of the turret to move the plates out of register with their respective cradles.

8. In a transfer apparatus, a rotatable turret, links pivoted at one end to the turret at spaced points therearound for independent swinging movement in a vertical plane, cup assembly supports secured to the other ends of the links, means for rotating the turret to move the supports through transfer and discharge zones successively, and cam means for swinging the links to move the supports to a lowered position at the transfer zone and to an elevated position at the discharge zone.

9. In a transfer apparatus, a rotatable turret, links pivoted at one end to the turret at spaced points therearound for independent swinging movement in a vertical plane, cup assembly supports secured to the free ends of the links, means for rotating the turret to move the supports through transfer and discharge zones successively, cam means for swinging the links to move the supports to lowered positions at the transfer zone and to elevated positions at the discharge zone, and means for adjustably regulating the lowermost positions of the supports collectively.

10. In a transfer apparatus, a rotatable turret, links pivoted at one end to the turret at spaced points therearound for independent swinging movement in a vertical plane, cup assembly supports secured to the free ends of the links, means for rotating the turret to move the supports through transfer and discharge zones successively, cam means for swinging the links to move the supports to lowered positions at the transfer zone and to elevated positions at the discharge zone, means connecting the supports and turret and cooperating with the links to control the inclination of the supports at the discharge zone, and means for adjustably regulating the lowermost positions of the supports collectively.

11. In a transfer apparatus, a rotatable turret, a link pivoted to the turret at one end thereof, a cup assembly support pivoted to the turret at one end thereof, a cup assembly on each support, means for rotating the turret to move the assembly through transfer and discharge zones successively, cam means for swinging the link to move the support to a lowered position at the transfer zone and to an elevated position at the discharge zone, and a second link pivoted at one end to the turret at a point above the pivotal point for the first link, the free end of the second link being pivoted to the support at a point above the pivotal point for the free end of the first link, said links cooperating with each other to control the inclination of the support.

12. In a tumbler transfer apparatus, means for receiving inverted tumblers at the take-out zone of a burn-off machine and for partially uprighting the same and for discharging the partially uprighted tumblers by gravity at a transfer zone, a plurality of tumbler receiving cups mounted for revolution about an axis and movable upon revolution thereof from a lowered inclined position at the transfer zone to an elevated upright position at a discharge zone, each cup comprising a tumbler receiving cradle and a tumbler support normally in register therewith and movable independently relative thereto, and an abutment at the discharge zone in the path of movement of the support and adapted to be engaged by the latter to move the same out of register with the cradle to release the tumbler supported thereby.

13. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup-assembly supports pivoted to the turret and movable upon rotation of the turret from lowered positions in the vicinity of the transfer zone to elevated positions at a discharge zone, a cup assembly on each support for receiving the tumblers at the transfer zone, means for adjustably regulating the lowermost positions of the cup assembly supports collectively, and means for rotating the turret.

14. In a tumbler transfer apparatus, means for receiving inverted tumblers at the take-out zone of a burn-off machine and for partially uprighting the same and for discharging the partially uprighted tumblers by gravity at a transfer zone, a plurality of tumbler receiving cups mounted for revolution about an inclined axis and movable upon revolution thereof from a lowered inclined position at the transfer zone to an elevated upright position at a discharge zone and vice versa, each cup comprising a tumbler receiving cradle and a tumbler support normally in register therewith and movable independently relative thereto, and means for retracting the tumbler supports to move the same out of register with the cups in the vicinity of the discharge zone.

15. In a tumbler transfer apparatus, means for receiving inverted tumblers at the take-out zone of a burn-off machine and for partially uprighting the same and for discharging the partially uprighted tumblers by gravity at a transfer zone, a plurality of tumbler receiving cups mounted for revolution about an inclined axis and movable upon revolution thereof from a lowered inclined position at the transfer zone to an elevated upright position at a discharge zone and vice versa, each cup comprising a tumbler receiving cradle and a tumbler support normally in register therewith and movable independently relative thereto, means for retracting the tumbler supports to move the same out of register with the cups in the vicinity of the discharge zone, and spring means for restoring such registry of the cups and supports during movement of the cups from the discharge zone to the receiving zone.

16. In a tumbler transfer apparatus, means for receiving inverted tumblers at the take-out zone of a burn-off machine and for partially uprighting the same and for discharging the partially uprighted tumblers by gravity at a transfer zone, a rotatable turret, a plurality of cup assembly supports mounted on the turret and movable upon rotation of the latter from lowered positions in the vicinity of the transfer zone to elevated positions at a discharge zone, a cup assembly on each support for receiving the tumblers at the transfer zone, a drive shaft extending centrally through the turret, a slip clutch mechanism operatively connecting the shaft and turret in driving relationship, and means for rotating the drive shaft.

CARL W. SCHREIBER.